May 22, 1951        J. C. RICHARDSON        2,553,981
SELF-UPSETTING COUPLING
Filed March 6, 1947
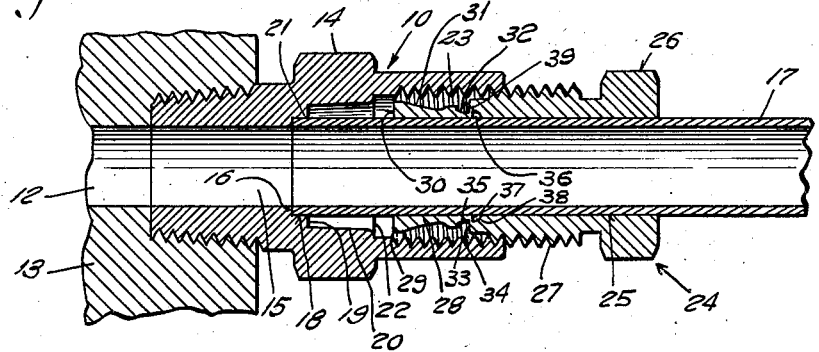
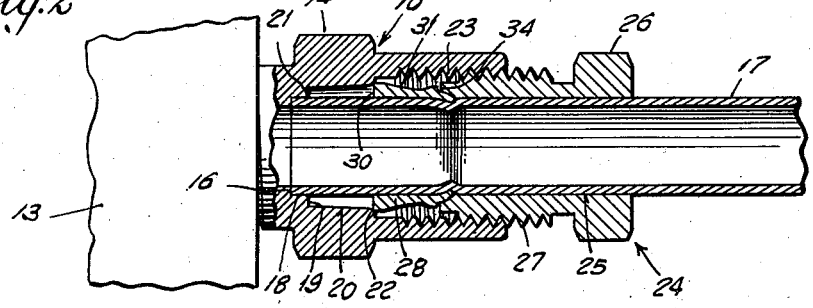
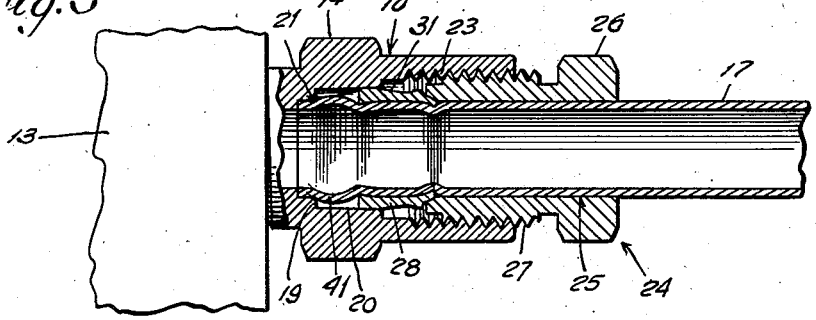
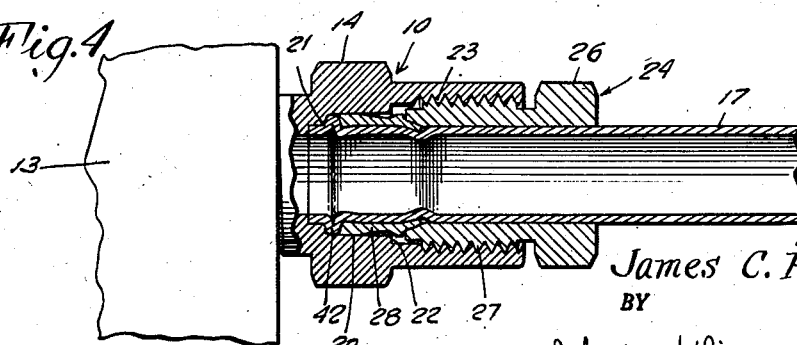
INVENTOR.
James C. Richardson
BY
Johnson, Kline and Hensel
ATTORNEYS Patented May 22, 1951

2,553,981

UNITED STATES PATENT OFFICE 2,553,981

SELF-UPSETTING COUPLING

James C. Richardson, Waterbury, Conn., assignor to The Brockway Company, Naugatuck, Conn., a corporation of Connecticut Application March 6, 1947, Serial No. 732,855

8 Claims. (Cl. 285—166)

This invention relates to couplings or connecting means for ductile pipes, tubes and other hollow conduits (hereinafter called "pipe"), and particularly to couplings which were adapted to form an upset double-walled flange in the pipe for clamping the same in the coupling during the operation of making up the connection.

The need for convenient and satisfactory means for connecting bendable or ductile pipe, of metals such as copper, aluminum, tin, iron, lead and alloys of these and other metals, as well as of non-metallic ductile plastics, to fittings and orifices of engines, machines and other apparatus has been of long standing. Many proposals have been made in an attempt to satisfy this need.

In numerous forms of couplings the end of the pipe is flared and the flared portion clamped in leaktight relation between parts of the coupling. The flaring of the pipe however tends to thin the walls thereof so that the clamped portion is substantially weakened. Moreover, when the connection is subjected to excessive stress or vibration in axial or lateral direction, the flared portion sometimes fractures or yields and permits the connection to be severed or the pipe to be pulled from between the clamping surfaces of the coupling.

A more secure coupling or connection is obtained with pipe having a right angle or reverse flange clamped between suitable clamping surfaces in a coupling. However, when a single walled flange is formed on ductile pipe, thinning and weakening of the pipe wall occurs to an even greater extent than in the case of a flare. This is avoided by upsetting the walls of the pipe to form a double-walled flange as disclosed in my co-pending applications, Serial Numbers 702,026 of October 8, 1946, now Patent No. 2,545,930, and 716,370 of December 14, 1946, now Patent No. 2,522,194. In the couplings therein described, however, the upset flange was preformed on the pipe, and in many cases, parts of the coupling had to be assembled with the pipe before the flange-forming operation.

In accordance with this invention, I provide a coupling adapted to receive an undeformed end of a threadless ductile pipe having no preformed flare or flange on the end thereof, and upon making up or tightening the coupling, a double-walled upset radial flange is formed on the pipe and clamped in leaktight relation with the coupling parts. The pipe can be cut to the desired length, its end inserted in the coupling, and the connection made up without the necessity of preforming a flange on the pipe, or the inconvenience of assembling parts of the coupling with the pipe before such preforming operation.

In accordance with the invention, I provide a body or fitting to which the pipe is to be connected, integral with other structure or adapted for installation thereon, having a transverse annular abutment for engaging and positively supporting the end of a ductile pipe to be connected thereto. The fitting has a counterbore for receiving the end of the pipe, extending to a point adjacent said abutment, said counterbore forming an annular space surrounding the pipe of a diameter at least equal to that of the desired upset flange. The fitting also includes draft means engaging corresponding draft means on a connector (constituting the other parts of the coupling) for advancing the connector toward said abutment.

The connector has an unobstructed bore for slidably receiving the pipe, and through which the pipe extends to seat against said abutment on the fitting. When the connector is advanced by said draft means it is adapted, incidental to such advancement, to grip a portion of the pipe spaced from the inner end of said counterbore and form a driving connection therewith. Upon further advancement of the connector, the walls of the pipe between said abutment on the body and the point at which the pipe is gripped is subjected to axial compression and the walls of the pipe yield thereunder, bulging outward within the space of the counterbore, first forming a ridge or bead, and then as the two sides of the bead are forced together, forming a double-walled upset flange. The leading end of the connector advances into the counterbore and finally engages the flange on the pipe to clamp the same firmly against the inner end of the counterbore, thereby forming a leaktight connection between the pipe and the body.

To effect the foregoing operation the connector comprises a draft member or nut for cooperation with the draft means on the body, and a sleeve or ferrule surrounding the pipe which is advanced by said draft member to grip the pipe. The sleeve has a bore through which the pipe extends, and as it advances into the counterbore of the body it is constricted thereby against the pipe, and grips the same to form a driving connection therewith. Preferably the sleeve is also constructed to cooperate with the draft member so that the latter can constrict the sleeve against the pipe at a second point spaced from the leading end thereof to form a second driving connection with the pipe, when the sleeve encounters resistance to its advancement offered by the body. In this way the pipe is gripped at two spaced points so that the required axial force can be transmitted to the pipe without excessive deformation of the pipe by the gripping action of the sleeve.

The draft member and sleeve of the connector can be made as separate parts, but in the form of the invention at present preferred the sleeve and draft member are made in one piece and are interconnected by a frangible web which is severed during the making up of the connection, by the time the sleeve grips the pipe. Thus, while the draft member rotates until the connection is fully made up, the sleeve and the pipe are advanced without rotation. By making the connector in one piece, loss of one or more of the coupling parts during storage or handling is avoided.

The form of coupling herein illustrated and described represents a preferred embodiment of the invention. In this embodiment, the abutment engaging the end of the pipe is spaced a short distance from the inner end of the counterbore within which the pipe is to be upset, and the wall of the body intermediate the abutment and counterbore corresponds in diameter to the outside diameter of the pipe, so as to confine the end portion thereof against upsetting during the making up of the coupling. This arrangement insures better control of the size and shape of the upset flange and substantially eliminates any tendency for the end of the pipe to slip past the abutment into the communicating passage of the body. The edge of the shoulder at the junction of the counterbore with the wall of the pipe end receiving bore is advantageously rounded to prevent from biting into the material of the pipe at the base of flange.

The draft means on the body is preferably an internally threaded portion which cooperates with external threads on the rear portion of the connector so as to utilize the space around the pipe more economically, and thus reduce the side of the coupling parts to a minimum for a given pipe size.

The counterbore can be cylindrical, but to facilitate dismantling of the connector for repair or cleaning, the counterbore can be tapered slightly toward its inner end to permit the removal of the upset flange of the pipe and the clamping sleeve of the connector.

The leading end portion of the sleeve is slightly oversize with respect to the counterbore of the body, so that upon entering the same it will be forcibly constricted against the pipe. To facilitate initial constriction of the sleeve the mouth of the counterbore and/or the leading end of the sleeve is formed with a camming surface, e. g. by chamfering or rounding the edge.

Cooperating camming surfaces are provided on the draft member and the rear end of the sleeve, preferably by constructing a wedging surface on the draft portion converging rearwardly and a cooperating external wedge surface on a portion of the sleeve adapted to turn inward against the pipe during advancement thereof.

When the connector is made in one piece, with a frangible web interconnecting the draft member and the sleeve, the frangible web and the cooperating cam surfaces are advantageously formed by an internal annular groove in the wall of the bore of the connector spaced rearwardly from an adjacent external angular groove or reduced portion of the connector, the narrow web between the grooves being frangible by shearing in axial direction, in response to compressive force applied to the web. For this purpose, the apex of the inner groove approaches axial alignment with the base of the external groove, or may overlap the base of the external groove in radial direction. When the web is sheared under axial compression applied thereto during the advancement of the connector on the fitting, the severed end of the sleeve portion slips into the space of the internal groove, and the cooperating surfaces of the two grooves thereby brought into contact are shaped to cam the severed end of the sleeve inward against the pipe, while at the same time providing a bearing surface on which the draft member can rotate relative to the sleeve.

In making up a connection with a preferred form of coupling of my invention, a piece of ductile pipe is cut to the desired length and inserted through the bore of the connector, which is previously threaded onto the body, or not as desired. The connector is started on the body, and the pipe is slid inward until its end rests against the annular abutment on the body. The connector is then advanced on the body until the sleeve encounters the mouth of the counterbore, which temporarily resists its further progress. Continued rotation of the draft member severs the web between the sleeve and draft member, and brings the coacting cam surfaces adjacent the web on the two parts into operative engagement. As the draft member is further advanced the forward end of the sleeve is forced into the counterbore and constricted thereby against the pipe while the rear end of the sleeve is simultaneously constricted by coaction of the camming surfaces on the draft portion, and the rear end of the sleeve portion forming a pair of driving connections with the pipe. Friction between the body and the sleeve when constricted thereby prevents the sleeve from rotating during further advancement thereof by the draft member.

The pipe is thus gripped at spaced intervals by the sleeve, and the gripped portion is advanced, subjecting the projecting end portion of the pipe between the supporting abutment on the body and the leading end of the sleeve to axial compression. This causes the walls of the pipe to upset within the counterbore, and as the sleeve and the portion of the pipe gripped thereby is further advanced, the walls of the upset are brought together to form a double-walled radial flange. Finally, the leading end of the sleeve enters the counterbore behind the upset flange and clamps the latter against the base of the counterbore to form a leaktight seal between the pipe and the body. A second seal is formed between the constricting wall of the counterbore and the sleeve constricted thereby, and a third seal is formed between the sleeve and the pipe.

My invention will be more fully understood from the following description of a preferred embodiment of my invention, taken in conjunction with the accompanying drawings, wherein:

Figure 1 is an axial cross-section of a coupling in accordance with my invention assembled with the end of a length of ductile threadless pipe, the parts being in their positions preliminary to making up of the connection;

Fig. 2 is a partial axial cross-section of a coupling of Fig. 1 during the initial gripping operation of the connector;

Fig. 3 is a view similar to Fig. 2 showing the relation of the parts during the upsetting operation;

Fig. 4 is a view similar to Fig. 2 showing the position of the parts of the coupling after it has been fully made up.

Referring to the drawings, the coupling as illustrated in Fig. 1 comprises a body or fitting 10, having a threaded rear portion for securing the same in a correspondingly threaded orifice of a passage 12 in a structure 13 to which a pipe is to be connected. The body has a nut portion 14 of hexagonal or other conventional shape to facilitate installing the body in said orifice. A bore 15 extends through the rear end of the body to communicate with the passage 12 in the structure 13, the bore 15 having a diameter corresponding substantially to the internal diameter of the pipe to be connected to said passage.

The bore 15 terminates at an annular abutment 16, lying substantially in a plane at right angles to the axis of the body, for engaging the end of a length of ductile pipe 17. A short cylindrical socket 18, having a diameter conforming to the outside diameter of the pipe 17, extends a short distance outward from the abutment 16 and terminates at a flat shoulder 19 forming the base of a counterbore 20 of cylindrical, or preferably slightly tapered shape. The diameter of the counterbore is approximately equal to or greater than the diameter of the upset flange to be formed from the walls of the ductile pipe 17. The edge 21 at the junction of the cylindrical socket 18 and the shoulder 19 at the base of the counterbore 20 is preferably rounded or chamfered to prevent its cutting into the material of the pipe.

The counterbore 20 extends outward to a camming shoulder 22 of rounded or chamfered shape to facilitate entry and constriction of a connector sleeve when it is forced into said counterbore. The distance between the shoulder 19 and shoulder 22 is somewhat greater than the length of pipe which is to form an upset double-walled flange.

The body preferably has a hollow tubular extension, extending outward from the shoulder 22 and having internal threads 23 for cooperation with corresponding threads on the connector.

The connector 24 is a tubular member having an unobstructed bore 25 therein for slidably receiving the ductile pipe 17. A rear or draft portion comprises a nut 26 of hexagonal or other conventional shape for engaging a wrench, and external threads 27 for engaging the threads 23 on the body or fitting.

The connector further comprises a forwardly extending sleeve portion 28 initially integral with the draft portion. At its leading end, the sleeve portion 28 is slightly larger than the mouth of the counterbore 20 on the body and has a rounded or chamfered leading edge 29 adapted to cooperate with chamfered corner 22 to facilitate the entrance of the sleeve into the counterbore 20.

The end surface 30 of the sleeve portion 28 can be made flat, substantially at right angles to the axis of the connector. For a short distance behind the leading edge 29, the external surface of the sleeve portion is cylindrical, merging into a surface 31 of slightly concave arcuate contour, which extends to an external annular groove 32. The front and rear sides 33 and 34 of the external groove 32 may be substantially flat, while its base surface 35 is of arcuate concave contour, gradually tapering rearwardly so that the deepest point of the groove is at the base of the rear side 34.

An internal groove 36 is formed in the wall of the bore of the connector and is spaced a short distance behind the external groove 32. The front surface 37 of the internal groove is flat, while the rest of the groove is formed by a wall 38 of concave arcuate contour curving inward in rearward direction to join the bore of the connector. The internal groove 36 is substantially narrower than the external groove 32, and its apex is substantially aligned in axial direction with the apex at the base of external groove 32.

The material of the connector between the adjacent apices of the grooves forms a frangible web 39 adapted to shear substantially in axial direction when subjected to moderate compression, whereupon the fractured end of the sleeve slips into the space provided by groove 36 and is cammed inward by the cooperation of surface 38 with surface 35 of the external groove.

In using the coupling to make up a connection, the ductile pipe 17, which can be of copper, tin, aluminum, zinc, lead, steel or alloys of these metals, or of ductile non-metallic plastics, is inserted through the bore of connector 24 which is advantageously threaded part way into the body 10 until the inner end of the pipe enters the cylindrical socket 18 of the body, and its end surface seats against the annular abutment 16.

The connector is then threaded into the body 10 until the leading end of the sleeve enters the mouth of the counterbore 20. The resistance offered thereby to further advancement of the sleeve subjects the web 39 to sufficient compression to cause it to shear in axial direction; and as advancement of the draft portion continues the fractured end of the sleeve enters the space afforded by internal groove 36 and is cammed inward against the pipe 17 by coaction of surface 35 with surface 38, causing the sleeve to grip and emboss the pipe and thereby forms a driving connection therewith as shown in Fig. 2. Inward camming action of surface 38 applies progressively increasing axial force to the sleeve portion as the constricting operation proceeds until the leading end of the sleeve is forced to enter the counterbore 20. The leading end of the sleeve is thereby constricted against the pipe by cooperation of chamfered shoulders 31 and 22, so that the walls of the counterbore 20 constrict the leading end of the sleeve against the pipe, gripping and embossing the same to form a second driving connection therewith at the leading end of the sleeve. Frictional engagement of the walls of the counterbore with the sleeve prevents rotation of the latter and the draft member, and the contacting surfaces of the draft member and sleeve form a bearing to facilitate such rotation.

After the sleeve grips the pipe at two points as aforesaid, the gripped portion of the pipe is advanced together with the sleeve by the draft member subjecting the end portion of the pipe in advance of the sleeve to axial compression. As a result, that portion of the projecting end of the pipe which is unconfined, i. e. extending from the shoulder 19 at the base of the counterbore 20 to the leading end 30 of the sleeve, bulges outward as shown in Fig. 3 to form an annular ridge or bead 41.

As the advancement of the sleeve together with the draft member continues, the sides of the bead 41 are forced together to form a double-walled flange 42, shown in Fig. 4, extending outward substantially in radial direction from the pipe between the end surface of the sleeve and the shoulder 19. Final tightening of the draft member clamps the flange 42 between the leading end of the sleeve and shoulder 19 at the base of the counterbore in leaktight relation. To the extent permitted by its ductility, the leading end of the sleeve molds itself to the shape of the flange 42, forming a tight seal therewith, while the sleeve is tightly confined in the counterbore 20, filling the same and forming a seal between the sleeve and the body. Thus, a seal is formed not only between the pipe and the fitting but also between the sleeve and the fitting, as well as between the sleeve and the pipe.

Variations and modifications may be made within the scope of this invention and portions of the improvements may be used without others.

I claim:

1. In a coupling for threadless ductile pipe, a body having a bore surrounded by a transverse abutment shoulder for engaging and supporting the end of said pipe, and a counterbore adjacent said abutment shoulder having a diameter greater than the outside diameter of said pipe, said counterbore terminating in an annular camming shoulder spaced from said abutment shoulder; a connector including a sleeve having at least a part of greater diameter than the diameter of said camming shoulder, and draft means for advancing the sleeve past said camming shoulder into said counterbore toward said abutment shoulder, whereby said sleeve is compressed to circumferentially grip the pipe and form a driving connection therewith at a point spaced from said abutment shoulder, and whereby continued advancement of the sleeve after formation of said driving connection serves to subject the wall of the pipe between said connections and said abutment shoulder to axial compression so as to first expand the wall into said annular space in the form of a double-walled flange and then to clamp said double-walled flange between the bottom of said counterbore and the end of said sleeve in leaktight engagement.

2. A coupling as defined in claim 1 including means intermediate said abutment and said annular space for confining the walls of the end portion of the pipe against expansion into said annular space.

3. In a coupling for threadless ductile pipe, a body having a transverse abutment for supporting the end of said pipe, and a wall surrounding a length of said pipe, adjacent the supported end thereof, in radially spaced relation so as to form an annular cavity surrounding the pipe; a connector comprising a sleeve for slidably receiving said pipe; a draft member operable on said body for advancing said sleeve towards said abutment; at least the end of said sleeve having an outside diameter larger than the diameter of said cavity for constricting said sleeve against the pipe to form a driving connection therewith upon advancement of the sleeve into said annular cavity, a cam shoulder at the entrance to said cavity for constricting the leading end of said sleeve against the pipe upon advancement of the sleeve into said annular cavity, cam means on said draft member for concurrently constricting a rearwardly spaced portion of said sleeve against the pipe to form a second driving connection therewith, advancement of said sleeve after formation of said driving connections serving to compress the walls of the pipe between the sleeve and said abutment in advance of the sleeve in axial direction to cause the walls thereof to upset into said annular cavity in the form of a double-walled flange; and transverse clamping surfaces, respectively at the inner end of said annular cavity and on the leading end of said sleeve, for clamping said flange between them in leaktight relation when the sleeve is fully advanced into said cavity.

4. A coupling as defined in claim 1 wherein said annular cavity has a gradual taper to facilitate removal of the upset double-walled flange and the sleeve therefrom in dismantling of the connection.

5. A coupling as defined in claim 3 wherein said sleeve and said draft means of the connector are initially connected by a frangible web which is fractured by continued operation of said draft member after the sleeve engages said cam means on the body, said cam means on the draft member being constituted by a surface adjacent said frangible web for constricting the fractured end of the sleeve to form said second driving connection with the pipe.

6. A coupling for threadless ductile pipe comprising a body having a bore for communicating with a piece of ductile pipe when connected thereto, a transverse abutment for supporting the end of said pipe; a counterbore extending inward in the body to a point adjacent said abutment and forming an annular cavity for surrounding the pipe adjacent the supported end thereof, said counterbore having a camming shoulder at the mouth thereof, and an internally threaded sleeve on the body extending outward from said camming shoulder; a connector comprising a tubular member having a bore therethrough for slidably receiving said pipe; a rearwardly disposed draft portion having external threads for cooperation with the threads in the sleeve of the body; a forwardly extending sleeve portion having a leading end adapted to be constricted against the pipe so as to form driving connection therewith when the leading end is forced against said camming shoulder by said draft portion to enter the annular cavity of the body; an external annular groove intermediate the ends of said connector and an internal annular groove adjacent thereto, axially spaced behind said external groove and forming therewith a frangible web adapted to shear in response to axial compression, said grooves having cam surfaces adjacent said web cooperating after shearing thereof to constrict the fractured end of the sleeve portion against the pipe and thereby form a second driving connection therewith spaced rearwardly from the first-named driving connection, advancement of said sleeve by said draft member after formation of said driving connections compressing the pipe in advance of said sleeve in axial direction, so as to expand the same into an annular double-walled flange within said annular cavity; and clamping surfaces on the leading end of said sleeve portion and at the inner end of said counterbore for clamping said flange in leaktight relation upon final advancement of said sleeve portion into said cavity.

7. A coupling as defined in claim 6 wherein said sleeve includes an external surface of concave cross-sectional contour to prevent buckling of the sleeve portion during flange-forming operation thereof.

8. A coupling as defined in claim 6 wherein said internal groove in the connector is narrower than the outer groove so that the fractured end of the sleeve portion will completely fill the inner groove during constricting operation of the adjacent cam surfaces.

JAMES C. RICHARDSON.

REFERENCES CITED

The following references are of record in the file of this patent:

UNITED STATES PATENTS

| Number | Name | Date |
|---|---|---|
| 1,337,547 | Dohner | Apr. 20, 1920 |
| 1,755,210 | Dohner | Apr. 22, 1930 |
| 2,258,528 | Wurzburger | Oct. 7, 1941 |